June 9, 1959

A. MACOVSKI 2,890,272

AUTOMATIC CHROMA CONTROL

Filed Dec. 1, 1954

2 Sheets-Sheet 1

INVENTOR.
Albert Macovski

BY [signature]
ATTORNEY

INVENTOR.
Albert Macovski
BY Olin L. Mitchell
ATTORNEY 2,890,272
Patented June 9, 1959

2,890,272

AUTOMATIC CHROMA CONTROL

Albert Macovski, Massapequa, N.Y., assignor to Radio Corporation of America, a corporation of Delaware Application December 1, 1954, Serial No. 472,390
9 Claims. (Cl. 178—5.4)

The present invention relates to improvements in color television receiving systems and more particularly to improvements in automatic chroma control circuits for use in conjunction with color television receiving systems.

One of the problems peculiar to color television reception is the manner in which frequency selective fading of the color television signal during space transmission affects the color fidelity of the reproduced color television image. In accordance with the present FCC color television transmission standards a color television signal may be considered as comprising three basic parts: a brightness and deflection synchronizing component, a chrominance component, and a color burst synchronizing component. The brightness and deflection synchronizing components are broadcast in substantially the same manner as conventional monochrome television signals. For color television transmission this basic monochrome type of transmission is supplemented by a carrier suppressed color subcarrier modulated with color information and situated at the upper frequency end of the normal video frequency spectrum. Thus, in present day color television brightness or luminance information falls in the frequency range of 0–4 mc. while the chrominance or color information occupies the video frequency range from 2–4 mc. The color subcarrier is established at approximately 3.58+ mc. which is related to scene line scanning frequency of the television system such that chrominance information is frequency interlaced with luminance information. The transmitted color burst synchronizing component comprises a minimum of eight cycles of energy at the color subcarrier frequency at a predetermined place. This reference burst may then be separated from the composite color television signal and employed to synchronize a local oscillator at the receiver which generates the required synchronous demodulating signal for separating chrominance signals from luminance signals.

In color television signal reproduction, the relative balance in amplitude between the luminance or brightness information (0–4 mc.) and the amplitude of the color subcarrier (3.58 mc.) will determine the saturation or dilution of the reproduced colors. In color television receivers the demodulated color information is processed in two independent channels. The brightness information occupies a frequency range of from 0 to 4 mc. while the chrominance or color difference information occupies a frequency range of from 2 to 4 mc. Color difference information is an indication of how the color of the image being scanned differs from a black and white image. The brightness channel is generally provided with a standard monochrome television type automatic gain control circuit which, in response to the amplitude of deflection synchronizing signals, tends to stabilize at least the lower frequency limits of the brightness signals.

Likewise, the chrominance channel is supplied with a gain control circuit responsive to the amplitude of the color burst. Thus, if the high frequency elements of the broadcast color signal tend to fade relative to the lower frequency elements due to atmospheric phenomena, the brightness channel AGC and the chrominance channel gain control circuit will tend to maintain a better balance between the color subcarrier and the brightness components. This in turn results in a color television picture in which the change in color saturation due to selective frequency fading is greatly reduced.

A primary object of the present invention is to provide an improved and simplified means for controlling the gain of the color or chrominance signal channel of a color television receiver as a function of received color subcarrier signal intensity.

In accordance with the present invention, the burst synchronizing component is separated from the composite color television signal and applied to a high Q ringing circuit tuned to the burst frequency. The energy developed across the ringing circuit is then applied to a limiter which acts to provide substantially constant amplitude wave at the burst or subcarrier frequency for use in the color demodulator circuits of the receiver. Means are provided for developing a control voltage representing the amount of limiting imposed by the limiter on the energy developed across the ringing circuit. This control voltage is used as a gain control signal for the chrominance channel of the receiver.

It is another object of the present invention to provide an improved gain control circuit suitable for use in color television receivers to produce an automatic chrominance control action.

It is a further object of the present invention to provide an improved and simplified automatic chrominance control for use in color television receivers.

A more complete understanding of the present invention as well as its objects and features of advantage may be obtained through a reading of the following specification, especially when considered in conjunction with the accompanying drawings, in which.

Figure 1:
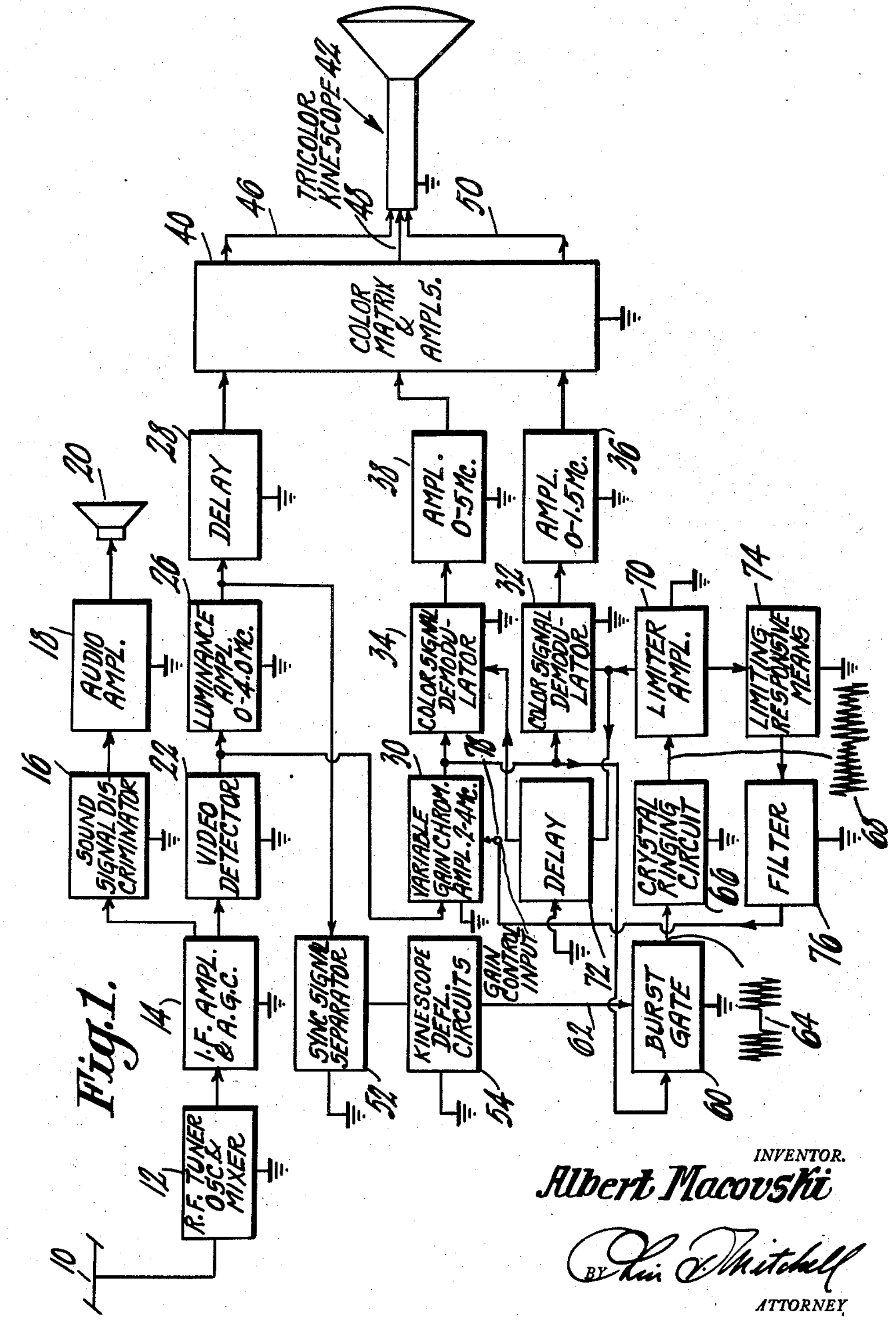
Fig. 1 is a block diagram representation of a color television receiving system embodying the present invention.

Turning now to Fig. 1, there is indicated at 10 a television receiving antenna designed for interception of broadcast color television signals. The radio frequency tuner 12 coupled with the antenna is connected in driving relationship to a conventional intermediate frequency (I.F.) amplifier 14. Output signal from the I.F. amplifier is applied to a sound signal discriminator 16 which provides an audio signal to the amplifier 18 for reproduction by the sound signal transducer 20.

In furher accordance with well known color television receiver techniques, the intermediate frequency signal from the amplifier 14 is applied to a video detector 22, whose output signal represents the demodulated composite color television signal. As stated hereinabove, the composite signal delivered by the video detector 22 includes a luminance component and a deflection synchronizing component. The luminance component is accepted by the luminance amplifier 26 for amplification to the signal delay means 28. The chrominance component of the color signal is accepted by the variable gain chrominance amplifier 30, whose output signal is applied to the conventional color signal demodulators at 32 and 34 respectively. The color signal information is amplified by the amplifiers 36 and 38 for application to the color matrix 40 to which the luminance signal from the delay element 28 is also applied.

The color matrix 40 properly combines the demodulated color signal and luminance signals to produce tricolor signals for application to the color kinescope 42 via the circuit paths 46, 48 and 50. Deflection synchronizing signal is separated from the incoming color television signal by means of synchronizing signal separator 52 to which is applied luminance signal from the amplifier 26. The kinescope deflection circuits are indicated in block 54.

In accordance with well accepted practice the local color signal demodulation carrier for application to the color signal demodulators 32 and 34 is developed by gating out the burst color synchronizing component of the demodulated color television signal. Since the burst synchronizing component is established at a reference or unmodulated frequency of the color subcarrier, the output signal from the variable gain chrominance amplifier 30 may be applied to the burst gate circuit 60. Also in accordance with well accepted practice, the gate circuit 60 is keyed by means of the horizontal flyback pulse developed in the kinescope horizontal deflection circuit. Circuit path 62 represents the application of the keying pulses as developed by deflection circuits to the burst gate 60. The separated burst 64 is then applied to some form of high Q ringing circuit having a resonant frequency corresponding to the color subcarrier. For this purpose, a crystal ringing circuit 66 is provided which when excited by the separated burst 64 produces a continuous but damped ringing signal 68. Due to the fact that the damped signal 68 is not of constant amplitude, it must be applied to a limiter means such as the limiter amplifier 70 to produce a constant amplitude signal suitable for application to the color signal demodulators 32 and 34. The delay network 72 represents means for providing any desired relative phase shift between the demodulation signals applied to the demodulators 32 and 34 as derived from the amplifier 70.

The general circuitry and operation of the elements thus far described in Fig. 1 are discussed in an article entitled "The CT–100 Commercial Color Television Receiver" appearing in the September 1954 issue of the RCA Review by Messrs. Kirkwood and Torre, pages 445–460.

In accordance with the present invention, automatic chrominance control of the color television receiving system shown in Fig. 1 is accomplished by a limiting responsive means 74 shown coupled with the limiter amplifier 70. The limiting responsive means may take a variety of forms but is of a nature which causes development of an output signal to the filter 76 which represents the amount of limiting imposed at any instant on the damped signal 68 by the limiter amplifier 70. It will be understood that since the damped ringing signal 68 from the ringing circuit 66 represents excitation of a passive circuit by means of the separated burst 64 that the average amplitude of the ringing signal 68 must be a direct function of the amplitude of the burst 64. In accordance with the present invention, the filter 76 may be tailored to smooth out any undesirable high frequency amplitude variation in the signal developed by the limiting response means 74 yet otherwise provide a suitable chrominance control signal to the gain control input 78 of the chrominance amplifier 30.

It is noted that a conventional automatic gain control (AGC) circuit is indicated as being incorporated in the I.F. amplifier 14. Such AGC action adjusts the overall gain of the radio frequency tuner and I.F. amplifier as a function of the received deflection synchronizing pulses.

Figure 2:
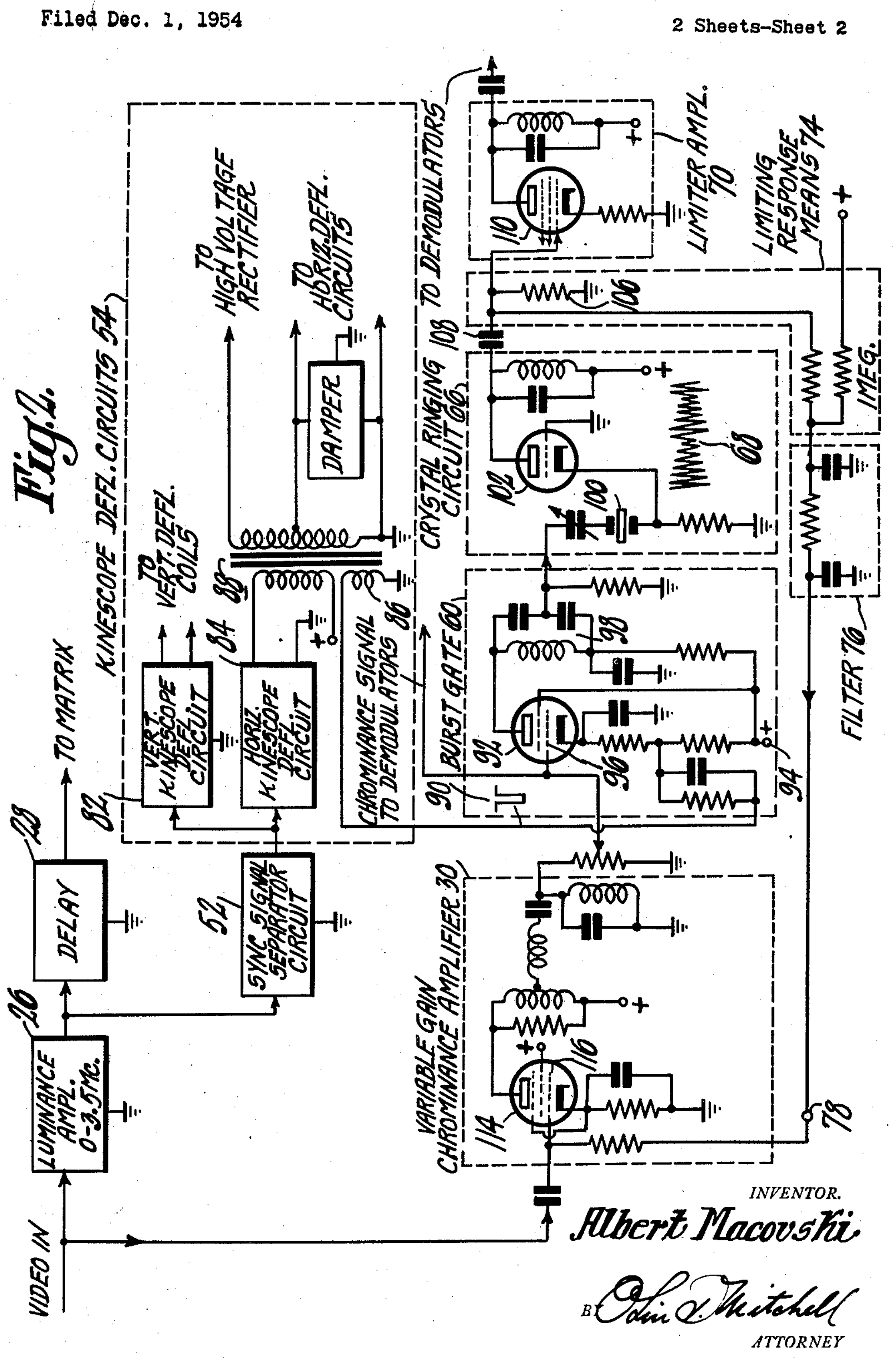
Fig. 2 is a combination block and schematic representation of one form of the present invention as for example more broadly illustrated in Fig. 1.

A more detailed showing of one way of carrying out the invention as illustrated in Fig. 1 is shown in Fig. 2. Here the luminance amplifier 26 is shown as receiving video signal from the circuit path 80 indicated in Fig. 1 connected with the output of the video detector 22. Video signal is also applied to the variable gain chrominance amplifier 30 shown in more detail within the dotted line area. The synchronizing signal separator circuit 52 is also shown as coupled with the kinescope deflection circuits shown in dotted line area 54.

The color kinescope deflection circuits 54 are shown as conventional in nature and comprising a vertical kinescope deflection circuit 82 and horizontal kinescope deflection circuit 84. A special secondary winding 86 on the horizontal deflection output transformer 88 develops suitable keying pulses 90 for the burst gate shown in dotted line area 60.

The burst gate 60 comprises a vacuum tube 92 which is normally biased off by virtue of the positive voltage applied at terminal 94. The keying pulses 90 swing the cathode of tube 92 sufficiently negative to produce conduction in the tube during intervals of the keying pulse. Since chrominance information is applied to the control electrode 96 of the gate tube and since the keying pulse 90 is caused to occur during the color synchronizing burst interval, it follows that separated burst signal will be periodically applied to the resonant circuit 98 connected with the anode of tube 92. To reduce the losses of the resonant circuit and hence decrease the amount of damping in the ringing produced by the separated burst signal, a crystal element 100 may be used to effectuate a high Q resonance at the subcarrier frequency. Output signal from the crystal ringing circuit amplifier 102 will be continuous but varying in amplitude due to the residual damping effect of the tuned circuit 98 between color ringing bursts.

As indicated in Fig. 1, output signal from the crystal ringing circuit 66 is applied to a limiter amplifier 70, whose purpose it is to eliminate any variation in the amplitude of the continuous wave signal delivered by the crystal ringing circuit. The limiter amplifier 70 is of the grid current limiting variety wherein the positive going excursions of the signal 68 will produce grid current through the resistor 106 which in turn will develop a charge on the capacitor 108 which changes the bias on the amplifier tube 110. If the time constant of capacitor 108 taken in combination with resistor 106 is made sufficiently short the amplitude of signal developed in the output circuit of the limiter tube 110 will be substantially constant.

In accordance with the present invention, advantage is taken of the fact that the average bias on the grid of the limiter tube 110 will be a function of receiver burst amplitude which, being the same frequency as the color subcarrier, represents the amplitude of the received color subcarrier. In accordance with the present invention the bias on the control electrode of tube 110 is applied to a filter circuit 76. The filtered bias on the limiter tube may then be used as a gain control potential for the variable gain chrominance amplifier. By way of illustration, the chrominance amplifier 30 is shown as comprising the pentode 114 whose control electrode 116 is biased in accordance with the potential applied to the gain control input terminal 78. The gain of the chrominance amplifier will therefore be rendered a function of the gain control potential delivered by the filter 76.

By way of example, if for any reason the amplitude of the higher frequency components of the received color television signal should become attenuated relative to the lower frequency components, the amplitude of the burst separated by the burst gate 60 will decrease. The amplitude of ringing across the tank 98 will then drop and the negative potential on the limiter grid (due to grid rectification action) will drop. This applies a more positive voltage to the chroma amplifier 16 which increases its gain and tends to correct for the drop in the amplitude of the separated burst. An increase in burst amplitude will conversely cause a more negative potential to be developed at the control electrode of the limiter tube 110. This is conveyed via the filter circuit 76 to the control electrode 116 of tube 114 to reduce its gain and thereby tend to correct for the increase in burst amplitude.

Having thus described the invention, what is claimed is:

1. In a color television signal receiving system the combination of: a signal amplifying means adapted to receive color television signals having a relatively high frequency color burst synchronizing component, a relatively low frequency deflection synchronizing signal and a modulated color carrier component; chroma control means operatively connected with said amplifying means and responsive to an applied chroma control signal for varying the effective gain of said amplifying means; means coupled with said amplifying means for separating said burst component from said composite television signal; means coupled with said burst separating means and responsive to the frequency of said burst component for developing a carrier demodulating signal for demodulation of said color signal carrier component, said carrier demodulating signal developing means being undesirably responsive to amplitude variations in said burst component; signal demodulating means coupled with said amplifying means and said carrier demodulating signal developing means for producing demodulated color signals; signal amplitude limiting means operatively connected between said carrier demodulating signal developing means and said signal demodulating means for limiting amplitude variations in said demodulating carrier signal prior to application to said demodulating means; means operatively connected with said amplitude limiting means for developing an indicating signal the value of which corresponds to the degree of limiting imposed by said limiting means on said demodulating carrier signal at any given time; filter means operatively connected with said indicating signal developing means for producing a control voltage representing a filtered version of said indicating signal; and means operatively connected between said filter means and said amplifier gain varying means for applying said control voltage to said gain varying means as a control signal therefor.

2. A color television automatic gamma control circuit comprising the combination of: a signal amplifying means having a frequency response characteristic permitting the amplification of composite color television signals having a color burst component and a deflection synchronizing pulse component, each of said components lying at substantially opposite extremes of the frequency spectrum occupied by said color television signals, said color television signals also having a modulated carrier component in the frequency range of said burst component; chroma control means operatively connected with said amplifying means and responsive to an applied chroma control signal for varying the effective gain of said amplifying means; means coupled with said amplifying means for separating said burst component from said composite television signal; means coupled with said burst separating means and responsive to the frequency of said burst component for developing a carrier demodulating signal for demodulation of said color carrier component, said carrier demodulating signal developing means being undesirably responsive to amplitude variations in said burst component; color signal demodulating means coupled with said amplifying means and said carried demodulating signal developing means for producing demodulated color signals; amplitude limiting means intercalated in the coupling between said means for developing said carrier demodulating signal and said color signal demodulating means; means connected with said amplitude limiting means for developing an indicating signal the value of which corresponds to the degree of limiting imposed by said limiting means on said demodulating carrier signal at any given time; filter means connected with said indicating signal developing means for producing a control voltage representing a filtered version of said indicating signal; and voltage coupling means connected between said filter means and said chroma control means with such electrical sense as to reduce the effective gain of said amplifying means in said burst component frequency range in response to an effective increase in the amplitude of said burst component.

3. In a color television receiving system for receiving demodulating and processing a composite television signal having a plurality of components including a burst component, the combination of: a signal amplifying system for television signals; a chroma control means connected with said amplifying system to which may be applied a chroma control voltage for controlling the relative balance of frequency components within said television signal; a color signal synchronous demodulating means coupled with said amplifying system, said synchronous demodulating means having a demodulation carrier input terminal to which is to be applied a substantially constant amplitude signal corresponding to the frequency of said burst component; means coupled with said amplifying system for separating said burst component from said composite television signal; a ringing circuit coupled with burst separating means for excitation by said separated burst component to produce a ringing signal; an amplitude limiting means connected between said ringing circuit and said synchronous demodulating means carrier input terminal for supplying to said demodulating means a limited form of the ringing signal produced by said ringing circuit; means coupled with said amplitude limiting means and responsive to limiting action therein to develop an indicating voltage the magnitude of which is a function of the degree of limiting imposed by said limiting means on said ringing signal; and means coupled with said indicating voltage developing means and said chroma control means applying said indicating voltage as a chroma control signal to said chroma control means.

4. In a color television receiving system for receiving demodulating and processing a composite television signal having a plurality of components including a recurrent burst component, the combination of: a signal amplifying system for television signals; a chroma control means connected with said amplifying system to which may be applied a chroma control voltage for controlling the relative balance of signal components within said television signal; a color signal synchronous demodulating means coupled with said amplifying system, said synchronous demodulating means having a demodulation carrier input terminal to which is to be applied a substantially constant amplitude and constant frequency signal corresponding to the frequency of said burst component; means coupled with said amplifying system for separating said burst component from said composite television signal; a crystal ringing circuit tuned for passive ringing at a frequency defined by said burst; means coupling said ringing circuit to said burst separation circuit for excitation by separated burst component whereby to produce trains of damped ringing signals having amplitude variations defined by amplitude variations in the strength of received television signal, the damping of said ringing circuit and the recurrence rate of said burst component; an amplitude limiting means connected between said ringing circuit and said synchronous demodulating means carrier input terminal for supplying to said demodulating means a limited form of the ringing signal produced by said ringing circuit; means coupled with said amplitude limiting means and responsive to limiting action therein to develop an indicating voltage the magnitude of which is a function of the degree of limiting imposed by said limiting means on said ringing signal; and means coupled with said indicating voltage developing means and said chroma control means applying said indicating voltage as a chroma control signal to said chroma control means.

5. In a color television receiving system for receiving demodulating and processing a composite television signal having a recurrent burst component, the combination of: a signal amplifying system for television signals; a chroma control means connected with said amplifying system to which may be applied a chroma control voltage for controlling the relative balance of frequency components within said television signal; a color signal synchronous demodulating means coupled with said amplifying system, said synchronous demodulating means having a demodulation carrier input terminal to which is to be applied a substantially constant amplitude signal corresponding to the frequency of said burst component; means coupled with said amplifying system for separating said burst component from said composite television signal; a crystal ringing circuit tuned for passive ringing at a frequency defined by said burst means coupling said ringing circuit to said burst separation circuit for excitation by separated burst component whereby to produce trains of damped ringing signals having amplitude variations defined by the damping of said ringing circuit and the recurrence rate of said burst component; an amplitude limiting means connected between said ringing circuit and said synchronous demodulating means carrier input terminal for supplying to said demodulating means a limited form of the ringing signal produced by said ringing circuit; means coupled with said amplitude limiting means and responsive to limiting action therein to develop an indicating voltage the magnitude of which is a function of the degree of limiting imposed by said limiting means on said ringing signal; filter means connected with said indicating voltage developing means for averaging out variations in said indicating voltage to produce a chroma control voltage and means coupled to said filter means and to said chroma control means for applying said chroma control voltage to said chroma control means.

6. In a color television receiving system for receiving and transducing a color television signal having at least a chrominance component, a luminance component and a burst component, said burst component defining a mean color carrier frequency, the combination of: a signal transducing means for transducing said received signal into visible color television pictures, said means having a frequency bandwidth acceptance accommodating said chrominance, luminance and burst components; chroma control means connected with said transducing means for varying the relative balance between said luminance and chrominance signal as a function of an applied chroma control signal; a color signal synchronous demodulating means included in said transducing means, said demodulating means requiring a supply of substantially constant amplitude signal of said mean color carrier frequency; mean coupled with said transducing means for separating said burst component from said color television signal; a ringing circuit coupled with burst separating means for excitation by said separated burst component to produce a ringing signal in response to said separated burst components; an amplitude limiting means connected between said ringing circuit and said synchronous demodulating means carrier input terminal for supplying to said demodulating means a limited form of the ringing signal produced by said ringing circuit; means coupled with said amplitude limiting means and responsive to limiting action therein to develop an indicating voltage the magnitude of which is a function of the degree of limiting imposed by said limiting means on said ringing signal; and means coupled with said indicating voltage developing means and said chroma control means applying said indicating voltage as a chroma control signal to said chroma control means.

7. In a color television receiving system for receiving and transducing a color television singal having at least a chrominance component, a luminance component and a burst component, said burst component defining a mean color carrier frequency, the combination of: a signal transducing means for transducing said received signal into visible color television pictures, said circuit having a frequency bandwidth acceptance accommodating said chrominance, luminance and burst components; chroma control means connected with said transducing means for varying the relative balance between said luminance and chrominance signal as a function of an applied chroma control signal; a color signal synchronous demodulating means included in said transducing means, said demodulating means requiring a supply of substantially constant amplitude signal of said mean color carrier frequency; a ringing circuit coupled with burst separating means for excitation by said separated bust component to produce a ringing signal; a vacuum tube amplifier means having at least a control grid electrode, an anode and a cathode, an input circuit defined by input circuit means connected between said control grid electrode and cathode, said input circuit being capable of permitting grid current flow between said control electrode and cathode; an output circuit defined by output circuit means connected between said anode and said cathode; means coupling said ringing circuit to said input circuit; means connected in said input circuit producing grid current amplitude limiting of said ringing signal as it appears in said amplifier output circuit; means included in said input circuit for developing an indicating voltage representing control electrode current resulting from limiting action; means coupling said output circuit to said synchronous demodulating means for supply thereto of a limited version of said ringing signal; and means coupled with said indicating voltage developing means and said chroma control means applying said indicating voltage as a chroma control signal to said chroma control means.

8. In a color television receiving circuit for receiving standard color television signals, the combination of: a video signal detector; means applying received color signals to said detector, said color signals having a burst component; a luminance channel means; a chrominance channel means; means coupling said detector to said luminance and chrominance channels for delivery of color television signals to said channels; a burst gate coupled with said chrominance channel means for separating color burst from chrominance channel signals; a crystal ringing circuit having an input and an output circuit, said ringing circuit being tuned to the freqeuncy defined by said color burst; a vacuum tube having at least a control electrode, anode and cathode; input circuit means connected with said tube so as to produce a grid current limiting amplifier in which the control electrode potential of said tube varies as a function of limiting action in said amplifier; means operatively coupling separated color burst from said burst gate to said ringing input circuit; means operatively coupling said output circuit of said ringing circuit to said vacuum tube input circuit means for applying ringing signal from said ringing circuit to said vacuum tube input circuit with sufficient amplitude to establish grid current limiting in said vacuum tube; a direct current conducting filter circuit connected with said control electrode to develop at the output of the filter circuit an averaged indicating potential gain control means coupled with said chrominance channel means and said filter means for controlling the gain of said chrominance channel as a function of the value of said indicating potential.

9. In a color television receiver for receiving a composite color television signal including a color information signal component and a color synchronizing burst component the combination comprising, means responsive to the color synchronizing burst component of said composite color television signal for developing a continuously oscillatory signal representative in frequency and amplitude of said color synchronizing burst component, a limiter circuit coupled between said continuously oscillatory signal developing means and utilization means in said receiver for providing said oscillator signal at substantially constant amplitude to said utilization means, means operatively connected with said limiter circuit for developing a control signal indicative of the degree of limiting of said continuously oscillatory circuit by said limiter, a signal translating circuit for the color information signal component of said composite color television signal, and means for applying said control signal to said signal translating circuit for controlling the response of said translating circuit to said color information signal component.

References Cited in the file of this patent

UNITED STATES PATENTS

| | | |
|---|---|---|
| 2,635,140 | Dome | Apr. 14, 1943 |
| 2,757,229 | Larky | July 31, 1956 |
| 2,798,900 | Bradley | July 9, 1957 |

FOREIGN PATENTS

| | | |
|---|---|---|
| 723,698 | Great Britain | Feb. 9, 1955 |
| 708,088 | Great Britain | Apr. 28, 1954 |